United States Patent
Han et al.

(10) Patent No.: US 12,499,166 B1
(45) Date of Patent: Dec. 16, 2025

(54) CONNECTION RECOMMENDATION AND COLLABORATION

(71) Applicant: Zoom Video Communications, Inc., San Jose, CA (US)

(72) Inventors: Lin Han, Los Altos, CA (US); Hang Kin Lau, Belmont, CA (US); Yike Liu, Santa Clara, CA (US); Andy Lopez, Santa Ana, CA (US); Ying Lu, Cerritos, CA (US); Marian Rydzanych, Greenbrae, CA (US); Hao Zhang, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/522,967

(22) Filed: Nov. 29, 2023

(51) Int. Cl.
*G06F 16/9535* (2019.01)
*G06Q 50/00* (2024.01)

(52) U.S. Cl.
CPC ......... *G06F 16/9535* (2019.01); *G06Q 50/01* (2013.01)

(58) Field of Classification Search
CPC ............................ G06F 16/9535; G06Q 50/01
See application file for complete search history.

(56) References Cited

U.S. PATENT DOCUMENTS

| | | | |
|---|---|---|---|
| 10,331,702 B2* | 6/2019 | Bilimoria | G06Q 50/01 |
| 11,558,475 B1* | 1/2023 | Miller | H04L 67/51 |
| 2010/0268661 A1* | 10/2010 | Levy | G06Q 30/02 |
| | | | 705/347 |
| 2011/0125989 A1* | 5/2011 | Amidon | G03C 8/4093 |
| | | | 713/1 |
| 2013/0275429 A1* | 10/2013 | York | G06F 16/435 |
| | | | 707/E17.002 |
| 2014/0040244 A1* | 2/2014 | Rubinstein | G06F 16/2423 |
| | | | 707/722 |
| 2015/0256353 A1* | 9/2015 | Busey | H04L 63/0421 |
| | | | 715/758 |
| 2016/0104067 A1* | 4/2016 | Xu | H04L 67/306 |
| | | | 706/46 |
| 2016/0132198 A1* | 5/2016 | Sinclair | G06Q 50/01 |
| | | | 715/739 |
| 2017/0024765 A1* | 1/2017 | Barenholz | G06Q 30/0255 |
| 2018/0157663 A1* | 6/2018 | Kapoor | G06F 16/35 |
| 2018/0253485 A1* | 9/2018 | Pappu | G06F 16/335 |
| 2019/0124471 A1* | 4/2019 | Chelnik | H04L 12/1827 |
| 2019/0173812 A1* | 6/2019 | Higgins | H04L 51/04 |
| 2019/0205973 A1* | 7/2019 | Gutnik | G06Q 30/0267 |
| 2019/0392531 A1* | 12/2019 | DeLuca | G06Q 50/01 |
| 2020/0167699 A1* | 5/2020 | Cohen | H04L 51/52 |

(Continued)

*Primary Examiner* — Jorge A Casanova
(74) *Attorney, Agent, or Firm* — Kilpatrick Townsend & Stockton, LLP

(57) ABSTRACT

Example methods and systems for connection recommendation are provided. A communication platform provides a user hub application comprising one or more application modules corresponding to one or more user applications. The communication platform accesses user data associated with a plurality of users at the one or more user applications via the user hub application. The plurality of users includes a first user and a set of other users. The communication platform determines a connection recommendation for the first user based on the user data and provides the connection recommendation to the first user via the user hub application.

17 Claims, 9 Drawing Sheets

(56) References Cited

U.S. PATENT DOCUMENTS

| | | | | |
|---|---|---|---|---|
| 2022/0374460 | A1* | 11/2022 | Yu | G06N 20/00 |
| 2022/0374844 | A1* | 11/2022 | Johnston | G06Q 10/1095 |
| 2023/0156010 | A1* | 5/2023 | Sarkar | G06Q 10/101 |
| | | | | 726/4 |
| 2024/0212005 | A1* | 6/2024 | De Gour | G06Q 50/01 |

* cited by examiner

CONNECTION RECOMMENDATION AND COLLABORATION

FIELD

The present application generally relates to virtual communication and more specifically relates to connection recommendation and collaboration.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
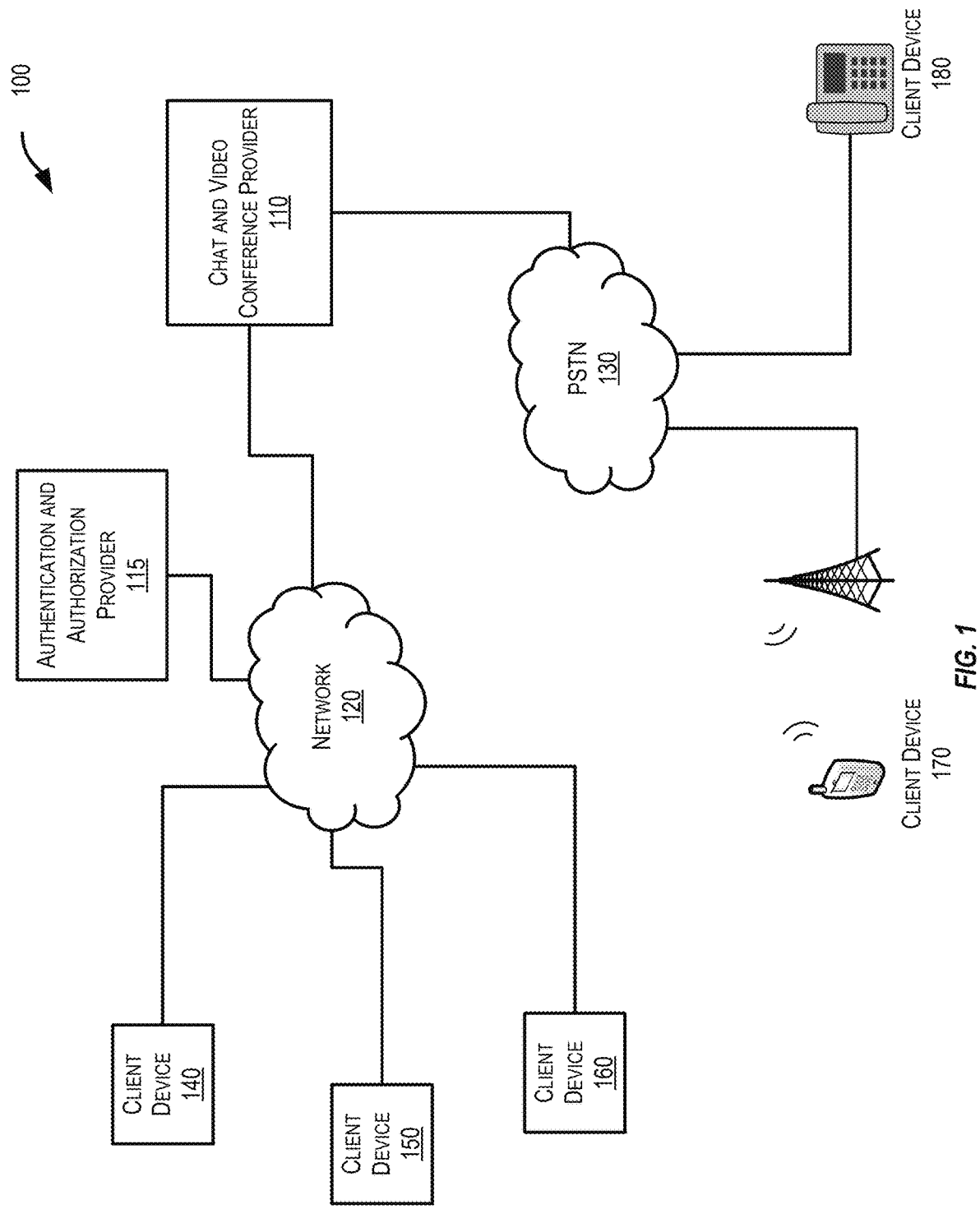
FIG. 1 shows an example system that provides videoconferencing and chat functionalities to various client devices.

Examples are described herein in the context of connection recommendation and collaboration. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Collaboration in virtual space or real life can be challenging. A person may not know who to collaborate with or have difficulty finding the right collaborators. Meanwhile, information about different users, for example, education, job title, calendar availability, chat messages, joined events, shared files, and shared status, is generated or stored by different applications. It is not easy for a person to access all relevant information associated with potential collaborators to connect and establish a collaboration relationship or to collaborate efficiently or effectively.

To facilitate a user to identify relevant users for collaboration, it is desirable for a communication platform to integrate various user applications to build a user hub application for data aggregation and connection recommendations. For example, an example communication platform provides an application integration engine for automatically integrating different applications and accessing user data from the different application and a connection recommendation engine for automatically recommending relevant users for potential connection and collaboration.

The application integration engine can integrate internal and external applications on the communication platform. In some examples, the application integration engine is configured for module federation, integrating various applications as micro-frontend modules into one application from the user's perspective, for example a user hub application. Examples of applications that can be integrated to a user hub application can be related to organization charts, chat channels or messaging, emails, document sharing, searches, video conferencing, user status, and scheduling. The user hub application can be an application including integrated user applications as modules. The user hub application can provide a user hub and database including user information aggregated from the various integrated applications.

The connection recommendation engine can collect, or access user data associated with users on the communication platform from various integrated applications. The user data can include user metadata and user activity data associated with a user. The user metadata can include a user's name, location, education, job title, department, hobby, contact information, or other information that can describe what the user is. The user activity data can include information about interactions with other users (e.g., chat messages, emails, video conferences, phone calls), search entries, and other data that can describe what the user does on the communication platform.

The connection recommendation engine can include a search module to enable a user to search the user hub or database for certain users via a GUI of the user hub application. The user can be searched by name, by job title, by department, by event, and any other suitable criteria. In some examples, an interactive dialogue window can be provided for a user to interact with the connection recommendation engine. A user can type in or speak certain keywords or questions. The connection recommendation engine can search the user hub or database based on the keywords or questions and generate an answer to provide to the user.

The connection recommendation engine can determine one or more connection recommendations for a specific user by comparing user data associated with other users to that associated with the specific user. The connection recommendation engine can implement artificial intelligence or machine learning (AI/ML) based recommendation algorithms to determine recommended users for connection or collaboration. For example, the connection recommendation engine can implement a collaborative filtering algorithm to identify users similar to a specific user. Also for example, the connection recommendation engine can determine a similarity between a user and the target user by comparing an embedding vector representing the user and the embedding vector representing the target user. Alternatively, or additionally, the connection recommendation engine can implement non-AI/ML-based algorithms to determine recommended user connections. For example, the connection recommendation engine can recommend to a target user one or more user connections that are in the same channel as the target user but are not connections to the target user yet. As another example, the connection recommendation engine can recommend to a target user one or more users that are also registered for an event but are not connected or interacted with the target user yet.

The connection recommendations can be provided to the target user via a graphic user interface (GUI) of a communication application provided by the communication platform and associated with the target user. For example, the GUI can display one or more connection recommendations in interactive GUI elements. Each interactive GUI element displays certain information about a corresponding recommended user connection. The interactive GUI element can be linked to a user information page. The user information page includes certain information about the corresponding user from certain applications integrated by the application integration engine. For example, the user information page can include basic personal information about a recommended user connection (e.g., name, location, job title, department, phone number, email address), organization chart associated with the recommended user connection, availability on calendar, or other information that is made public or available on the communication platform by the recommended user connection.

In some examples, the connection recommendation engine or the user hub application generated by the application integration engine can be integrated into or accessed by various applications on the communication platform to provide user information and facilitate various user actions. For example, the user hub application is integrated to the chat application on the communication platform. A user sends a chat message in a chat session with other users, asking who a person of a specific name is. The user hub application can automatically interpret the chat message, search the user database associated with the user hub application based on the chat message, and present the search results to the user.

This example communication platform automatically recommends user connections for collaboration. An application integration engine can integrate various applications on the communication platform to form a user hub application so that a connection recommendation engine can access user related data from different user applications and provide a user information page including user information aggregated from various application for a corresponding user. Connection recommendations can be tailored for specific users. The information accessible in a user information page is also tailored based on the relationship between a recommended user connection and the specific user. A user can also search for certain users by various criteria. The connection recommendation engine can also integrate into other applications to provide user related data. Thus, the application integration engine and the connection recommendation engine provide easy access to various user data and improve connection and collaboration based on data-driven connection recommendations.

This illustrative example is given to introduce the reader to the general subject matter discussed herein and the disclosure is not limited to this example. The following sections describe various additional non-limiting examples and examples of connection recommendation and collaboration.

Referring now to FIG. 1, FIG. 1 shows an example system 100 that provides videoconferencing and chat functionalities to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
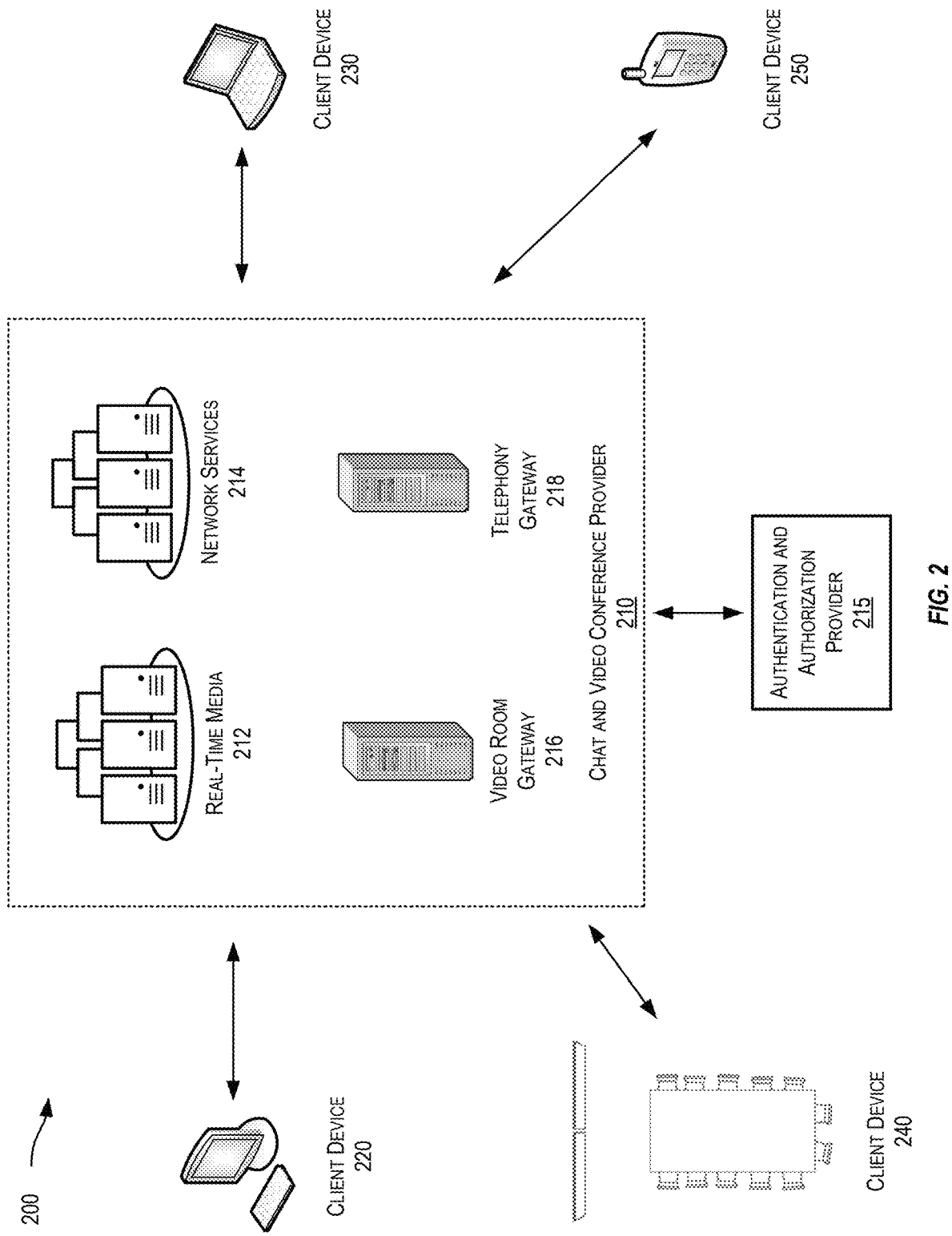
FIG. 2 shows an example system in which a chat and video conference provider provides videoconferencing and chat functionalities to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing and chat functionalities to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
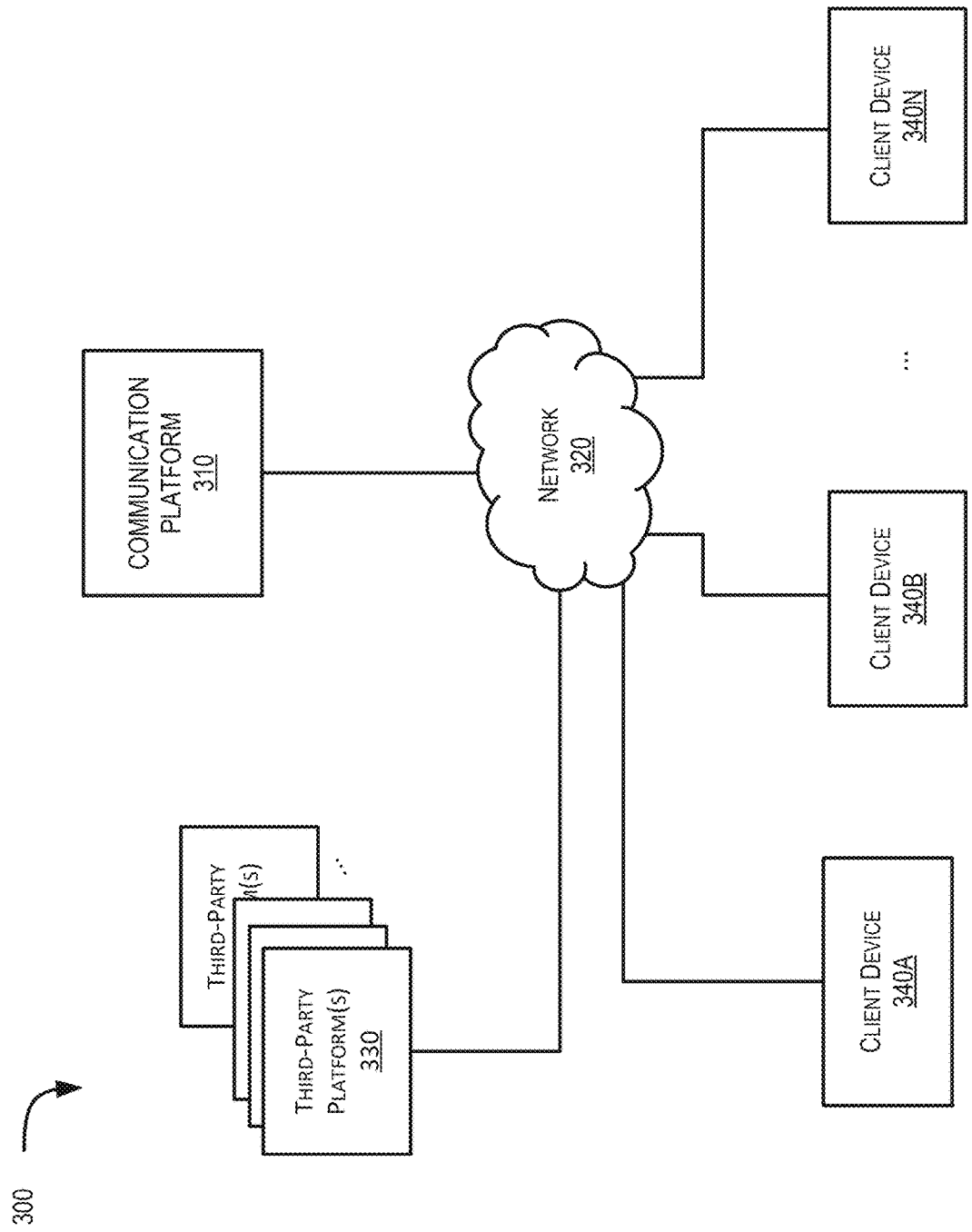
FIG. 3 shows an example system that can establish a virtual communication session.

Referring now to FIG. 3, FIG. 3 shows an example system 300 that can establish a virtual communication session. In this example system 300, a communication platform 310, one or more third-party platforms 330, and a number of client device 340A-340N (which may be referred to herein individually as a client device 340 or collectively as the client devices 340) are connected via a network 320. The communication platform 310 can be the chat and video conference provider 110 in FIG. 1 or the chat and video conference provider 210 in FIG. 2. The third-party platforms 330 can be any suitable platform that provides applications that can be integrated to the communication platform 310. The network 320 can be the internet or any suitable communications network or combination of communications network may be employed, including LANs (e.g., within a corporate private LAN), WANs, MANs, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the communication platform 310 using the internet or other suitable computer network. The client devices 340 have communication software installed to enable them to connect to the communication platform 310 for chats, video conferences, emails, and any other suitable communications. For example, during a chat session, a user associated a client device (e.g., client device 340A) can interact with other users associated with other client devices (e.g., client device 340B-340N) via the communication platform 310 by sending and receiving chat messages, and reacting to received chat messages.

Figure 4:
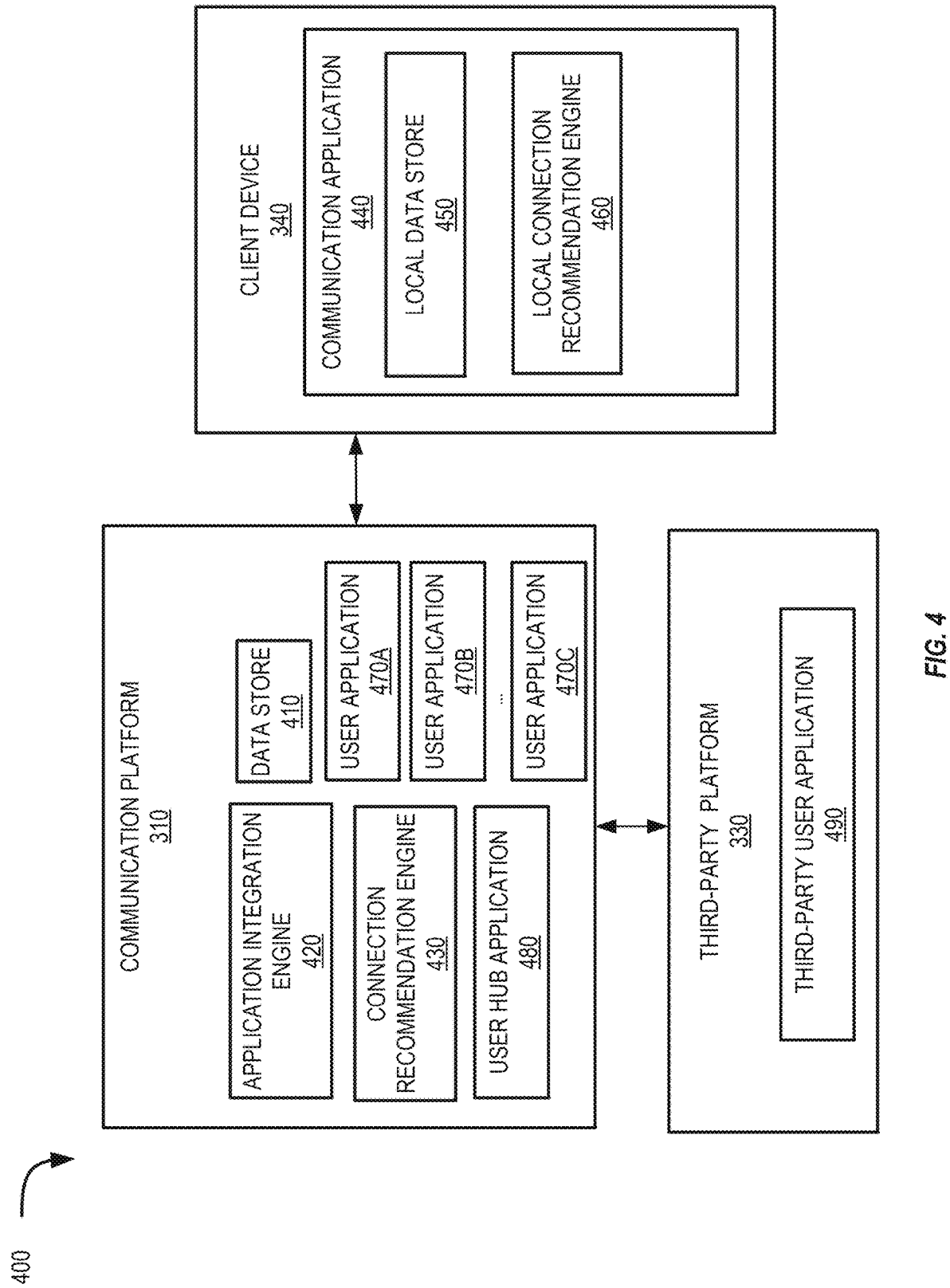
FIG. 4 shows an example system that is configured to automatically provide connection recommendations.

Now referring to FIG. 4, FIG. 4 shows an example system 400 that is configured to automatically provide connection recommendations. The communication platform 310 is in network communication with a third-party platform 330 and a client device 340. The client device 340 is installed with a communication application 440 provided by the communication platform 310. The communication platform 310 includes a data store 410, one or more user applications 470A-470N (which may be referred to herein individually as a user application 470 or collectively as the user applications 470), an application integration engine 420, and a connection recommendation engine 430. The data store 410 stores metadata about various user applications on the communication platform 310. The various user applications 470 can include internal applications provided by the communication platform 310. Alternatively, or additionally, the various user application can include external applications, for example a third-party user application 490 provided by a third-party platform 330 and integrated on the communication platform 310. Application metadata includes information about application creation, structure, purpose, dependency, and any suitable data that describes and provides context for a corresponding application. The data store 410 can also store user data retrieved from different user applications. User data can include user metadata and user activity data. Examples of user metadata include user location, job title (or occupation), education, joined chat channels, chat contacts, and other data that can describe a user. Examples of user activity data includes user interactions with chat contacts or other users, user activities in the joined chat channels, user search activities (e.g., searching for channels, or searching for certain materials), or other user activities on the communication platform 310.

The application integration engine 420 can integrate internal user applications 470 and third-party (external) user applications 490 on the communication platform 310. In some examples, the application integration engine 420 is configured for module federation using a micro-frontend architecture. In the micro-frontend architecture, a single application, e.g., a user hub application 480, can be built from disparate applications. A micro-frontend can be a complete application or specific fragments of an application, which can be integrated as modules for other applications. Various internal and external user applications can be integrated as micro-frontend modules to one application. Application metadata can be fetched from an application metadata store (e.g., data store 410 on the communication platform 310) where application configurations are submitted by application providers. If an application is already cached on a communication application 440, which is provided by the communication platform 310 and associated with a user, the application integration engine 420 can instantly load the application, integrate the application, and provide user data associated with the application in a user information page associated with the user. If an application is not cached on the communication application 440, the application integration engine 420 can obtain static content about the application from a cloud platform (e.g., a third-party platform 330 where the application is stored) or other source at runtime. The internal or external applications may need to update an existing module bundler so that the micro-frontends can integrate these applications as modules to build a new application, for example a user hub application 480. Examples of user applications 470 and 490 that can be integrated to the user hub application 480 can be related to profile cards, organization charts, chat messages, emails, document sharing, searches, video conferencing, user status, scheduling, or calendar. The user hub application 480 can provide a user hub or database including user information retrieved or aggregated from various integrated applications.

The connection recommendation engine 430 can collect, or access user data associated with a user on the communication platform 310 from various integrated applications. Alternatively, or additionally, the connection recommendation engine 430 can be a component of the user hub application 480 created by the application integration engine 420, configured to access user data from various integrated applications. The user data at the integrated applications can be accessed via Application Programming Interface (API). Alternatively, or additionally, certain user data can be stored in the data store 410 of the communication platform 310 and accessible with user consent. The user data can include user metadata and user activity data associated with a specific user. The user metadata can include the specific user's name, location, education, job title, department, hobby, contact information, or other information that can describe what the user is. The user activity data can include information about interactions with other users (e.g., users that the specific user interacted with, time that the user interacted with other users, chat messages, emails, video conferences, phone calls), search entries, and other data that can describe what the user does on the communication platform 310. In some examples, the connection recommendation engine 430 or another module on the communication platform 310 can profile a user by mining and processing user data associated with the user to generate a user description or label representing the user.

The connection recommendation engine 430 can determine one or more connection recommendations for a specific user by comparing user data (or generated user description or label) associated with other users to that associated with the specific user. The connection recommendation engine 430 can be AI/ML-based recommendation algorithms to determine recommended users for connection or collaboration. For example, the connection recommendation engine 430 can implement a collaborative filtering algorithm to identify users similar to a target user. Alternatively, or additionally, the connection recommendation engine 430 can implement a similarity model to select similar users. An embedding vector can be determined for each user on the communication platform based on corresponding user data. The connection recommendation engine 430 can determine a similarity score (e.g., a cosine similarity) for a user representing a similarity between the user and a target user, by comparing the embedding vector representing the user and the embedding vector representing the target user. Users can be ranked based on corresponding similarity scores, and certain users (e.g., corresponding similarity scores above a predetermined threshold) can be selected from a ranked list of users to recommend to the target user. Alternatively, or additionally, the connection recommendation engine can implement non-AI/ML-based algorithms to determine recommended users. For example, the connection recommendation engine 430 can recommend to a target user one or more users that are in the same channel as the specific user but are not connections to the target user yet. As another example, the connection recommendation engine 430 can recommend to a target user one or more users that are also registered for an event but are not connected or interacted with the specific user yet.

In some examples, the connection recommendation engine 430 also ranks existing user connections for a target user, for example to determine the top collaborators for the specific user, based on the user data associated with the target user. The connection recommendation engine 430 can implement a clustering algorithm to count and track certain types of user activities (e.g., chat, email, video conference) between the target user and certain other users (e.g., user connections of the target user). Clusters can be generated by user, and sub-clusters can be generated by activity. Activities can be counted to determine the activeness between the target user and another user. Top collaborators of the target user can be determined based on the activeness between the target user and other users.

The connection recommendations and top collaborators can be provided to a target user via the GUI of the communication application 440. For example, the GUI can display recommended users and determined top collaborators. Each user displayed in the GUI is represented by an interactive GUI element, displaying certain information about the corresponding user. The interactive GUI element can be linked to a user information page, which can be directed to by activating (e.g., by clicking or touching) the interactive GUI element. The user information page can include certain information about a corresponding user from certain applications integrated by the application integration engine 420. For example, the user information page can include basic personal information about a recommended user connection (e.g., name, location, job title, department, phone number, email address) and organization chart associated with the recommended user connection. The user information page can also include availability on calendar for scheduling, recent meetings, and other information that is made public by the corresponding user or shared between the corresponding user and the target user.

The connection recommendation engine 430 can also include a search module to enable a user to search for certain users, for example via a GUI of the communication application 440. Alternatively, or additionally, the search module can be a component, independent of the connection recommendation engine 430, on the communication platform 310. Still alternatively, or additionally, the search module can be a component of the user hub application 480 created by the application integration engine 420. A user can search for other users by name, by job title, by department, by event, and by any other suitable criteria. In some examples, the search module is an interactive module based on a generative pre-trained transformer (GPT) model, a large language model (LLM), or variations thereof. An interactive dialogue window can be provided by the GUI of the communication application 440 for a user to interact with the connection recommendation engine 430. A user can type in or speak certain keywords or questions, the connection recommendation engine 430 can search the user hub or database created by the application integration engine 420 based on the keywords or questions and provide a search result to the user.

In some examples, the connection recommendation engine 430 or the user hub application 480 created by the application integration engine 420 can be integrated into or accessible by various applications on the communication platform 310 to provide user information and facilitate various user actions. For example, the connection recommendation engine 430 is integrated to a chat application on the communication platform 310. A user can send a chat message in a chat session, asking who a person of a specific name is (e.g., who is John Smith?). The connection recommendation engine 430 or the independent search module, integrated with the chat application and running in the background, can automatically interpret the chat message, search the user hub or database created by the application integration engine 420 based on the chat message, and present a search result to the user. The search result can be presented to the user before or after a different user in the chat session responds to the chat message. The search results may be visible only to the user.

The communication application 440 installed on the client device 340 can include a local data store 450 and a local connection recommendation engine 460. The local data store 450 can store local application metadata (e.g., information about applications used by the local user), local user data (e.g., local user metadata and local user activity data), or other data that can be accessed by the communication application 440. The local connection recommendation engine 460 can be configured to recommend users for connection and collaboration, similar to the connection recommendation engine 430 as described above. The communication application 440 can also include a GUI for various user activities on the communication platform 310, for example, chat, email, phone call, video conference. The GUI can also include a tab for displaying recommended user connections and top collaborations and searching for certain users.

In some examples of the present disclosure, implementations may include or otherwise use one or more artificial intelligence or machine learning (collectively, AI/ML) systems having one or more models trained for one or more purposes. Use of such AI/ML systems, such as for certain features or functions, may be turned off by default, where a user, an organization, or both have to opt-in to utilize the features or functions that include or otherwise use an AI/ML system. User or organization consent to use the AI/ML systems or features may be provided in one or more ways, for example, as explicit permission granted by a user prior to the use of an AI/ML feature, as administrative consent configured using administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow the user to opt-out of use of the AI/ML systems or features.

To enhance privacy and safety, as well as provide other benefits, the AI/ML processing system may be prevented from using personal information (e.g., customer audio, video, chat, screen-sharing, attachments, or other communications-like customer content (such as poll results, whiteboards, or reactions)) to train any AI/ML models and instead only use the personal information for inferencing of the AI/ML processing system. Instead of using personal information to train AI/ML models, AI/ML model training may be performed using one or more commercially licensed data sets that do not contain the personal information of the user or organization.

Figure 5:
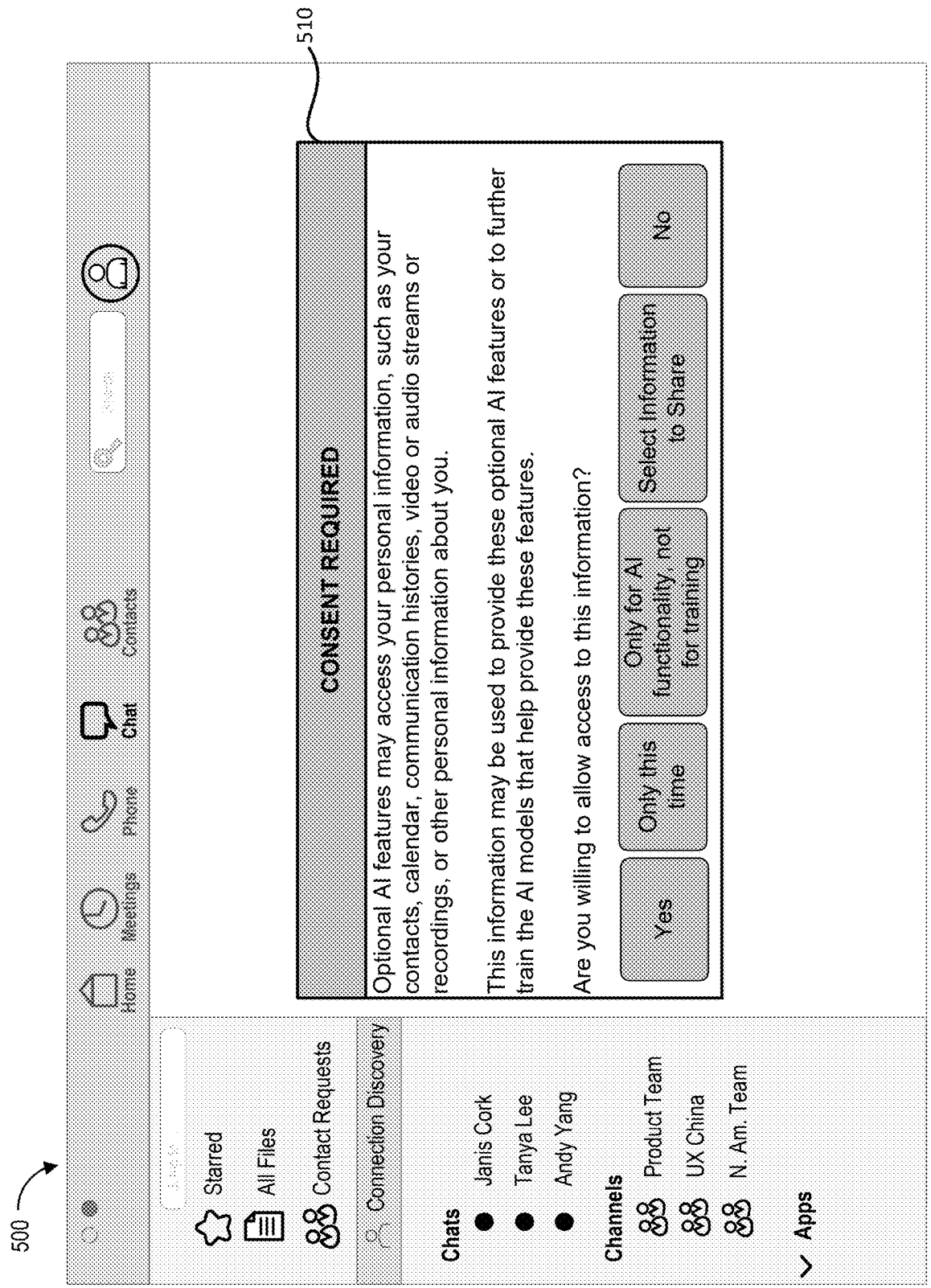
FIG. 5 shows an example GUI displaying a consent authorization request for accessing personal data.

Referring now to FIG. 5, FIG. 5 shows an example GUI 500 displaying a consent authorization request for accessing personal data. In some examples according to the present disclosure, a user may select an option to use one or more optional AI features available from a communication platform 310, such as the chat and virtual conference provider 110 or the chat and video conference provider 210. The use of these optional AI features may involve providing the user's personal information to the AI models underlying the AI features. The personal information may include the user's contacts, calendar, communication histories, video or audio streams, recordings of the video or audio streams, transcripts of audio or video conferences, or any other personal information available the virtual conference provider. Further, the audio or video feeds may include the user's speech, which includes the user's speaking patterns, cadence, diction, timbre, and pitch; the user's appearance and likeness, which may include facial movements, eye movements, arm or hand movements, and body movements, all of which may be employed to provide the optional AI features or to train the underlying AI models.

Before capturing and using any such information, whether to provide optional AI features or to providing training data for the underlying AI models, the user may be provided with an option to consent, or deny consent, to access and use some or all of the user's personal information. In general, Applicant's goal is to invest in AI-driven innovation that enhances user experience and productivity while prioritizing trust, safety, and privacy. Without the user's explicit, informed consent, the user's personal information will not be used with any AI functionality or as training data for any AI model. Additionally, these optional AI features are turned off by default-account owners and administrators control whether to enable these AI features for their accounts, and if enabled, individual users may determine whether to provide consent to use their personal information.

As can be seen in FIG. 5, a user has landed on a connection discovery page that may use an available optional AI feature. In response, the GUI has displayed a consent authorization window 510 for the user to interact with. The consent authorization window informs the user that their request may involve the optional AI feature accessing multiple different types of information, which may be personal to the user. The user can then decide whether to grant permission or not to the optional AI feature generally, or only in a limited capacity. For example, the user may select an option to only allow the AI functionality to use the personal information to provide the AI functionality, but not for training of the underlying AI models. In addition, the user is presented with the option to select which types of information may be shared and for what purpose, such as to provide the AI functionality or to allow use for training underlying AI models.

Figure 6:
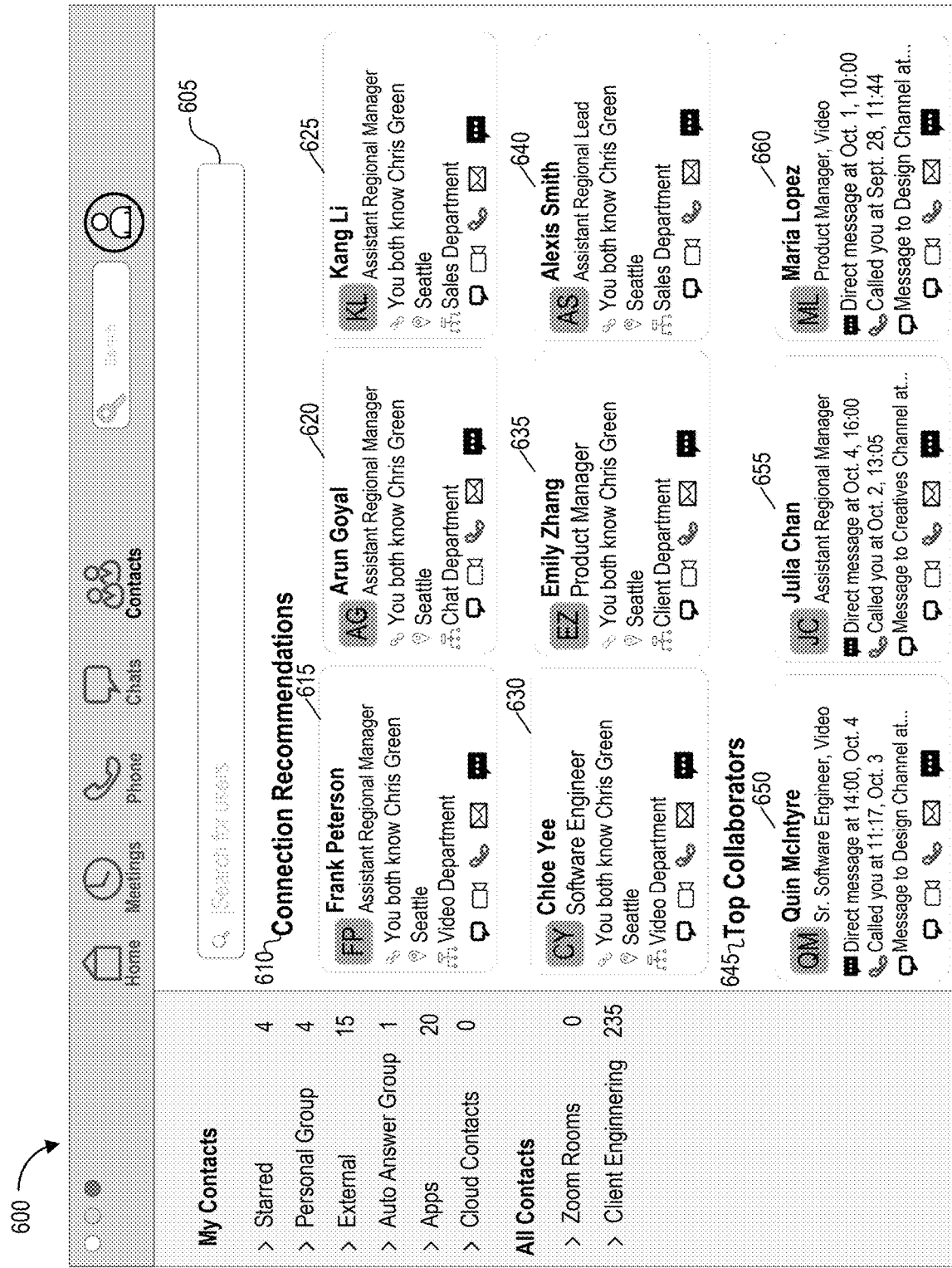
FIG. 6 shows an example GUI displaying connection recommendations and top collaborators.

Now referring to FIG. 6, FIG. 6 shows an example GUI 600 displaying connection recommendations and top collaborators. The example GUI 600 includes a search box 605, where a user can search for other users on the communication platform 310 by entering keywords. The example GUI 600 also includes a "connection recommendations" section 610 and a "top collaborators" section 645. The "connection recommendations" section 610 displays some recommended user connections in GUI elements 615, 620, 625, 630, 635, and 640. Each GUI element displays a recommended user's name, title, relationship with the user, user location, and user department. For example, GUI element 615 shows a recommended user connection named "Frank Peterson" for the user logged in to the GUI 600. Frank Peterson is an assistant regional manager. The user logged into the GUI 600 and Frank Peterson both know Chris Green. Frank Peterson is located in Seattle. Frank Peterson is in the video department with the organization. Each GUI element also includes shortcut buttons for chatting, meeting, phone call, email, and direct messages. When a "connection recommendation" GUI element is activated by touching or clicking, a user information page (not shown) can be directed to display more information about the recommended user connection, similar to the user information page to be described below in FIG. 7.

The "top collaborators" section 645 displays some top collaborators in GUI elements, for example GUI elements 650, 655, and 660. Each GUI element displays a top collaborator's name, title, and some information about the interaction between the top collaborator and the user logged into the GUI 600. For example, GUI element 650 displays a top collaborator named "Quin McIntyre," who is a senior software engineer in the video department. The GUI element 650 also shows that Quin Mcintyre, as a top collaborator, sent a direct message at 14:00 on October 4, called at 11:17 on October 3, and sent a chat message to the Design channel at certain time (not shown). When a "top collaborator" GUI element is activated by touching or clicking, a user information page (not shown) can be directed to display more information about the top collaborator, as will be described in FIG. 7.

Figure 7:
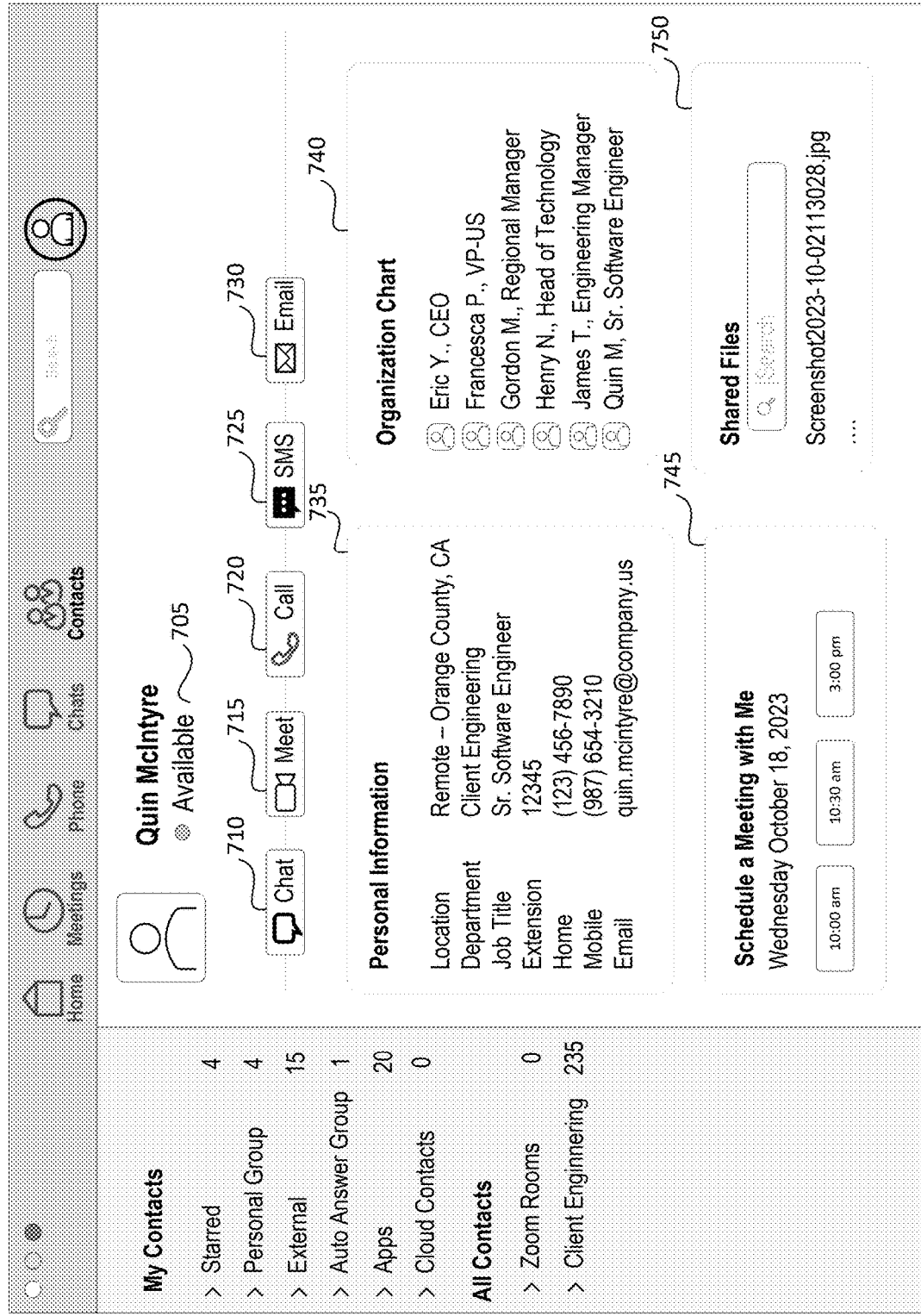
FIG. 7 shows an example GUI displaying a user information page associated with a top collaborator in FIG. 6.

FIG. 7 shows an example GUI displaying a user information page associated with a top collaborator in FIG. 6. The user information page is about "Quin McIntyre," which is a top collaborator for the user logged in the GUI 600 as shown in FIG. 6. The user information page in the GUI 700 includes a status 705 of Quin McIntyre. The user logged in the GUI 700 (the same as the user logged in the GUI 600) can interact with Quin McIntyre via a chat button 710, a video meet button 715, a phone call button 720, a short message service (SMS) button 725, or an email button 730. The user information page in GUI 700 also includes a person information section 735 displaying certain personal information about Quin McIntyre (e.g., location, department, job title, phone extension, home number, mobile number, email). The user information page in GUI 700 also includes an organization chart 740, including a ranking of personnel within the organization until Quin McIntyre. The user information page in GUI 700 also includes a calendar section 745, including availability of Quin McIntyre for scheduling a meeting. The user information page in GUI 700 also includes a shared file section 750, displaying files shared between Quin McIntyre and the user logged in the GUI 700 or files that Quin McIntyre has made publicly available within the organization.

Figure 8:
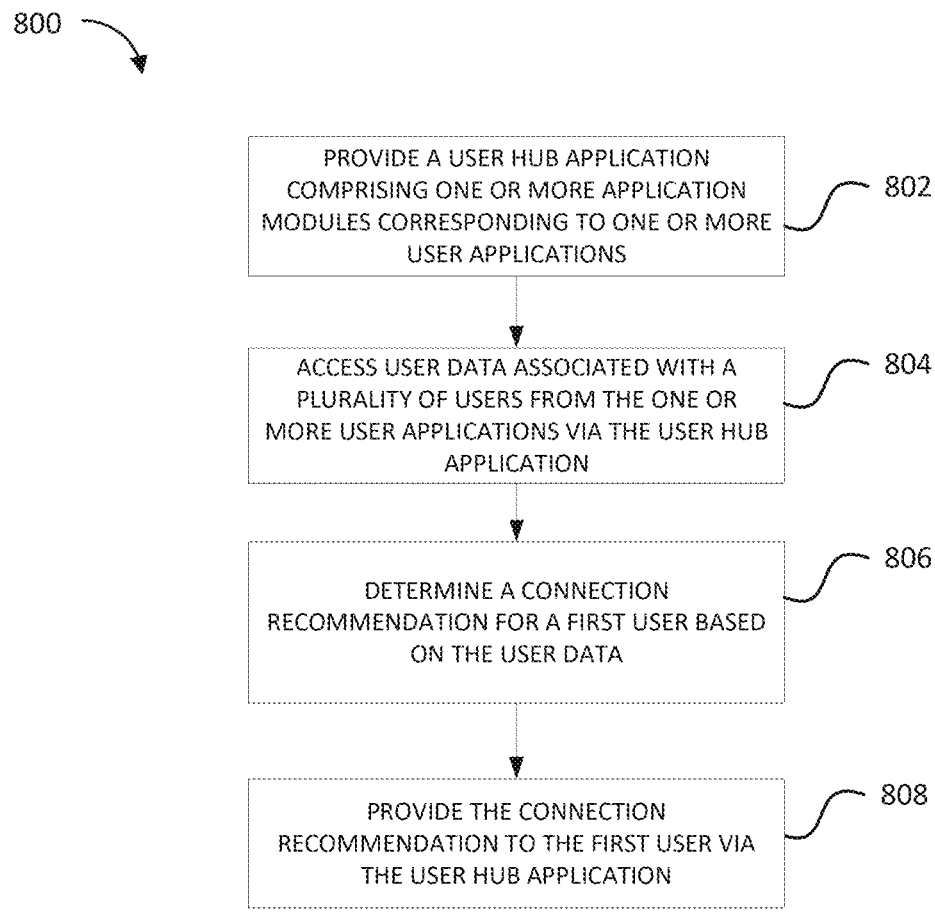
FIG. 8 shows an example method for connection recommendation.

Now referring to FIG. 8, FIG. 8 shows an example method 800 for connection recommendation. The example method 800 will be discussed with respect to the system 400 shown in FIG. 4; however, any suitable system for connection recommendation may be used.

At block 802, a communication platform 310 provides a user hub application 480 comprising one or more application modules corresponding to one or more user applications. The application integration engine 420 of the communication platform 310 can provide the user hub application 480 comprising one or more application modules, generally as described in FIG. 4. For example, various user applications or fragments of user applications, either internal (e.g., user applications 470) or external (e.g., user applications 490) to the communication platform 310, can be integrated into a user hub application 480 as applications modules using micro-frontends. Examples of the integrated user applications can be related to organization charts, chat messages, emails, document sharing, video conferencing, user status, and scheduling.

At block 804, the communication platform 310 accesses user data associated with a plurality of users from the one or more user applications via the user hub application 480. The plurality of users includes a first user and a set of other users. The user data can include user metadata and user activity data associated with users on the communication platform 310. The user metadata can include name, location, education, job title, department, hobby, contact information, user connections, and joined channels or groups. The user activity data can include virtual meeting data, chat data, search data, email data, and calendar data from the one or more user applications. The user data can be stored at corresponding user application. The application integration engine 420, the connection recommendation engine 430, or other components of the communication platform 310 can access the user data via micro-front ends integrating the corresponding user applications. Alternatively, or additionally, certain user data can be stored in the data store 410 on the communication platform 310. The connection recommendation engine 430 or other components of the communication platform can access the user data stored in the data store with user consent.

At block 806, the communication platform 310 determines a connection recommendation for the first user based on the user data. The connection recommendation engine 430 can determine one or more connection recommendations for a user on the communication platform 310, generally as described in FIG. 4. For example, the connection recommendation engine 430 can identify one or more users similar to the first user using a collaborative filtering algorithm. Also for example, the connection recommendation engine 430 can determine a first embedding vector for a first user based on a first set of user data corresponding to the first user and a second embedding vector for a second user based on the second set of user data corresponding to the second user. The connection recommendation engine 430 can implement a similarity model to determine a similarity score for the second user representing a similarity between the first user and the second user, for example a cosine similarity, based on the first embedding vector and the second embedding vector. If the similarity score is above a predetermined threshold value, the connection recommendation engine 430 selects the second user as a connection recommendation for the first user. The connection recommendation engine 430 can also rank the users based on their similarity scores with respect to the first user to create a ranked list of users, and select the first N users from the top of the ranked list as connection recommendations.

In some examples, the connection recommendation engine 430 can also determine one or more top collaborators for the first user based on the user data, for example by implementing a clustering algorithm to count and track certain types of interactions between a specific user and certain other users. In some examples, the connection recommendation engine 430 or the communication platform 310 also implements a search module or engine to enable a user to ask user related questions or search for certain users by name, job title, by education, by department, by event, and any other suitable criteria.

At block 808, the communication platform 310 provides the connection recommendation to the first user via the user hub application 480. The connection recommendations can be displayed in a GUI of the user hub application 480, which can be part of a communication application 440 provided by the communication platform 310 and associated with the first user. The connection recommendations can be displayed as interactive GUI elements. An interactive GUI element can display the name and title of a recommended user connection. In some examples, the interactive GUI element can also display the reason why a particular user is selected as a connection recommendation for the first user, such as the particular user and the first user both know certain users, or the particular user and the first user both go to an upcoming event. When activated by touching or clicking, the interactive GUI element for the connection recommendation can be directed to a user information page including more user data associated with the recommended user connection. For example, the user information page can include personal information about the recommended user connection, an organization chart, calendar availability for scheduling meetings, or any suitable data that the corresponding user shares publicly on the communication platform. Similarly, top collaborators determined at block 806 can also be displayed in the GUI as interactive GUI elements linked to corresponding user information pages.

The example process 800 illustrates a method for connection recommendation, directed to providing one or more connection recommendations to a user. However, not every step in the example process 800 may be needed, or some other steps may be added. The example process 800 is performed by a communication platform 310. Alternatively, the example process 800 can be performed by a communication application 440 installed on a client device 340.

Figure 9:
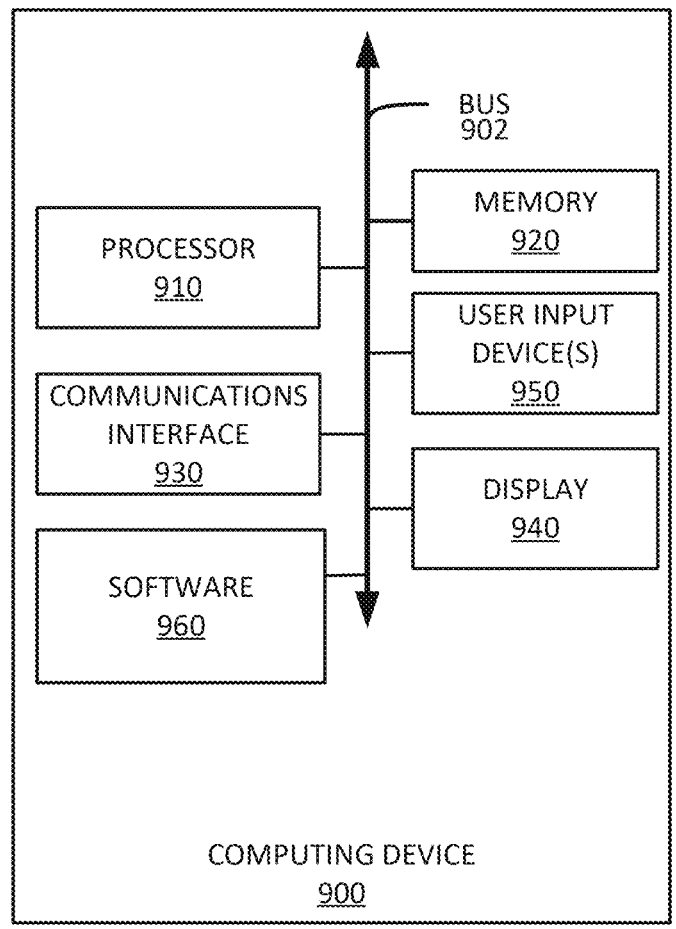
FIG. 9 shows an example computing device suitable for use in example systems or methods for connection recommendation and collaboration, according to certain examples.

Now referring to FIG. 9, FIG. 9 shows an example computing device 900 suitable for use in example systems or methods for connection recommendation and collaboration. The example computing device 900 includes a processor 910 which is in communication with the memory 920 and other components of the computing device 900 using one or more communications buses 902. The processor 910 is configured to execute processor-executable instructions stored in the memory 920 to perform one or more methods for connection recommendation and collaboration, such as part or all of the example method 800, described above with respect to FIG. 8. The computing device, in this example, also includes one or more user input devices 950, such as a keyboard, mouse, touchscreen, video input device (e.g., one or more cameras), microphone, etc., to accept user input. The computing device 900 also includes a display 940 to provide visual output to a user. The computing device 900 may also include a software 960. The software 960 may include a communication application (client application), a communication platform, and any other software to enable communication from a first user to a second user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   providing, by a communication platform, a user hub application comprising one or more application modules corresponding to one or more user applications;
   accessing, by the communication platform, user data associated with a plurality of users from the one or more user applications via the user hub application, wherein the plurality of users comprises a first user and a set of other users;
   determining a connection recommendation for the first user based on the user data, comprising:
      determining a first embedding vector for the first user based on a first set of user data corresponding to the first user;
      determining a second embedding vector for a second user based on a second set of user data corresponding to the second user;
      determining a similarity score for the second user based on first embedding vector for the first user and the second embedding vector for the second user; and
      in response to determining that the similarity score is above a predetermined threshold, selecting the second user as the connection recommendation; and
   providing the connection recommendation to the first user via the user hub application.

2. The method of claim 1, wherein providing a user hub application comprising one or more application modules comprises using a micro-frontend architecture to integrate the one or more applications modules with the user hub application.

3. The method of claim 1, wherein the one or more user applications comprise at least one third-party application.

4. The method of claim 1, wherein the user data comprises user metadata and user activity data, wherein the user metadata comprises name, location, education, job title, department, hobby, contact information, user connections, and joined channels or groups, wherein the user activity data comprises virtual meeting data, chat data, search data, email data, and calendar data.

5. The method of claim 1, further comprising enabling the first user to search for other users using keyword description, wherein the keyword description comprises name, location, job title, department, or hobby.

6. The method of claim 1, wherein determining one or more connection recommendations for the first user based on the user data comprises:
   identifying a user similar to the first user using a collaborative filtering algorithm.

7. The method of claim 1, further comprising:
   determining one or more top collaborators for the first user based on the user data; and
   providing an indication of the one or more top collaborators to the first user.

8. A system comprising:
   a communications interface;
   a non-transitory computer-readable medium; and
   one or more processors communicatively coupled to the communications interface and the non-transitory computer-readable medium, the one or more processors configured to execute processor-executable instructions stored in the non-transitory computer-readable medium to:
      provide a user hub application comprising one or more application modules corresponding to one or more user applications;
      access user data associated with a plurality of users from the one or more user applications via the user hub application, wherein the plurality of users comprises a first user and a set of other users;
      determine a connection recommendation for the first user based on the user data, comprising:
         determining a first embedding vector for the first user based on a first set of user data corresponding to the first user;
         determining a second embedding vector for a second user based on a second set of user data corresponding to the second user;
         determining a similarity score for the second user based on first embedding vector for the first user and the second embedding vector for the second user; and
         in response to determining that the similarity score is above a predetermined threshold, selecting the second user as the connection recommendation; and
      provide the connection recommendation to the first user via the user hub application.

9. The system of claim 8, wherein the one or more processors are configured to execute further processor-executable instructions stored in the non-transitory computer-readable medium to:
   using a micro-frontend architecture to integrate the one or more application modules into the user hub application.

10. The system of claim 8, wherein the user data comprises user metadata and user activity data, wherein the user metadata comprises name, location, education, job title, department, hobby, contact information, user connections, and joined channels or groups, wherein the user activity data comprises virtual meeting data, chat data, search data, email data, and calendar data.

11. The system of claim 8, wherein the one or more processors are configured to execute further processor-executable instructions stored in the non-transitory computer-readable medium to:
   enable the first user to search for other users using keyword description, wherein the keyword description comprises name, location, job title, department, or hobby.

12. The system of claim 8, wherein the one or more processors are configured to execute further processor-executable instructions stored in the non-transitory computer-readable medium to:
   determine one or more connection recommendations for the first user based on the user data using a collaborative filtering algorithm.

13. A non-transitory computer-readable medium comprising processor-executable instructions configured to cause one or more processors to:
   provide a user hub application comprising one or more application modules corresponding to one or more user applications;
   access user data associated with a plurality of users from the one or more user applications via the user hub application, wherein the plurality of users comprises a first user and a set of other users;
   determine a connection recommendation for the first user based on the user data, comprising:

determining a first embedding vector for the first user based on a first set of user data corresponding to the first user;

determining a second embedding vector for a second user based on a second set of user data corresponding to the second user;

determining a similarity score for the second user based on first embedding vector for the first user and the second embedding vector for the second user; and in response to determining that the similarity score is above a predetermined threshold, selecting the second user as the connection recommendation; and provide the connection recommendation to the first user via the user hub application.

14. The non-transitory computer-readable medium of claim 13, further comprising processor-executable instructions configured to cause one or more processors to:

using a micro-frontend architecture to integrate the one or more application modules into the user hub application.

15. The non-transitory computer-readable medium of claim 14, further comprising processor-executable instructions configured to cause one or more processors to:

enable the first user to search for other users using keyword description, wherein the keyword description comprises name, location, job title, department, or hobby.

16. The non-transitory computer-readable medium of claim 13, further comprising processor-executable instructions configured to cause one or more processors to:

determine one or more connection recommendations for the first user based on the user data using a collaborative filtering algorithm.

17. The non-transitory computer-readable medium of claim 13, further comprising processor-executable instructions configured to cause one or more processors to:

determine one or more top collaborators for the first user based on the user data; and provide an indication of the one or more top collaborators to the first user.

\* \* \* \* \*